(12) United States Patent
Schwab

(10) Patent No.: US 6,467,935 B1
(45) Date of Patent: Oct. 22, 2002

(54) TRANSPARENT PANE ARRANGEMENT

(76) Inventor: Armin Schwab, Sonnenstr. 2, Fuenfstetten (DE), 86681

( * ) Notice: Subject to any disclaimer, the term of this patent is extended or adjusted under 35 U.S.C. 154(b) by 0 days.

(21) Appl. No.: 09/574,116

(22) Filed: May 19, 2000

(30) Foreign Application Priority Data

May 19, 1999 (DE) .......................... 199 22 973

(51) Int. Cl.$^7$ .............................. F21V 11/02
(52) U.S. Cl. ................. 362/354; 362/318; 362/342; 359/275; 359/288
(58) Field of Search ................. 359/275, 288; 362/279, 290, 318, 342, 354

(56) References Cited

U.S. PATENT DOCUMENTS

| | | | | |
|---|---|---|---|---|
| 3,940,896 A | * | 3/1976 | Steel | 362/354 |
| 4,688,156 A | * | 8/1987 | Suzuki et al. | 362/354 |
| 4,832,468 A | * | 5/1989 | Ito et al. | 359/275 |
| 4,877,675 A | | 10/1989 | Falicoff | |
| 5,152,111 A | | 10/1992 | Baughman et al. | |

FOREIGN PATENT DOCUMENTS

| | | | |
|---|---|---|---|
| DE | 3822796 A1 | * | 10/1989 |
| DE | 4228927 A1 | * | 10/1993 |
| EP | 0 896 121 A1 | | 2/1999 |

* cited by examiner

Primary Examiner—Stephen Husar
(74) Attorney, Agent, or Firm—Townsend and Townsend and Crew LLP

(57) ABSTRACT

A transparent pane arrangement with a prescribed installation alignment comprises at least one transparent substrate and at least two mutually spaced layers made from a material with variable transmission properties for visible light and/or thermal radiation. Both layers respectively have strips which are arranged parallel to one another and are made from the material with variable transmission properties.

26 Claims, 4 Drawing Sheets

TRANSPARENT PANE ARRANGEMENT

Figure 1:
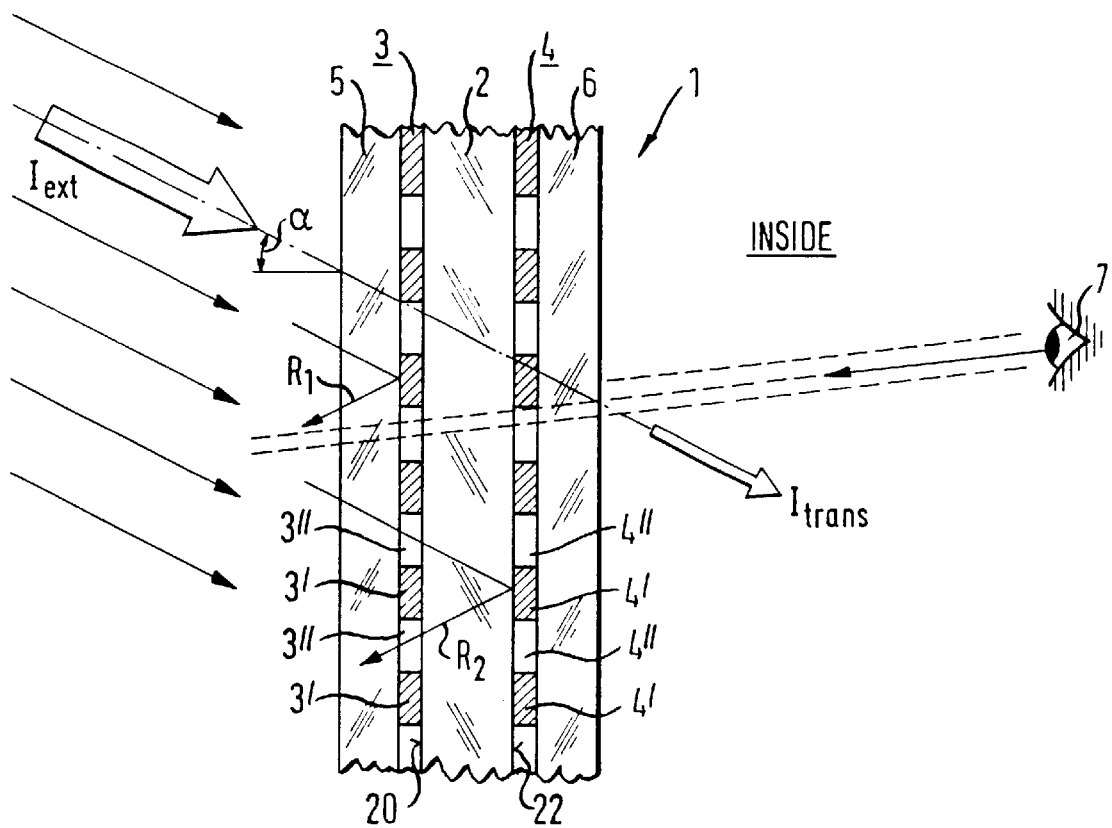

The invention relates to a transparent pane arrangement with variable transmission properties for visible light and/or thermal radiation. Such pane arrangements are generally used in and on buildings, but also in vehicles, in order specifically to influence glare phenomena, shading and transparency, but also to reduce heating up of the building interior or of the vehicle cabin by incident insolation. Again, the incidence of directly visible insolation in the respective interior is reduced, and a dazzling effect on people present in the space is thereby avoided. In addition, such a pane arrangement can also generally be used to influence the conditions of illumination and shading.

Numerous transparent pane arrangements with variable transmission properties are already known. For example, DE 38 07 598 A1 discloses a pane arrangement having two transparent panes which are arranged parallel to one another and on whose mutually facing surfaces a grid-like coating with increased reflection properties is applied in each case. One of the panes is arranged in a stationary fashion, and the other can be displaced, with the result that the individual grid bar elements either can be aligned in a covering fashion or can be arranged offset relative to one another, the pane arrangement being opaque in the case of offset arrangement, and transparent in the case of alignment in a covering fashion. Because of the panes which move relative to one another, such a pane arrangement is complicated in design and therefore expensive to produce.

One example for a glass pane having a whole-area coating by means of a layer made from electrochromic material is, for example, disclosed in DE 35 31 443 A1. However, this pane has the disadvantage that it darkens uniformly and completely upon activation of the electrochromic layer. Although, to be precise, the incidence of solar radiation is reduced, there is simultaneously a sharp reduction in the totality of the light entering the space in the building or the vehicle, so that it may be necessary to switch on artificial light in the building space although it is broad daylight outside.

It is therefore the object of the invention to specify a transparent pane arrangement with variable transmission properties for visible light and/or thermal radiation, which on the one hand effectively decreases the penetration of direct, dazzling solar radiation, but on the other hand keeps the darkening of the respective interior within acceptable limits and lets through sufficient daylight. It is also an object of the invention to specify a transparent pane arrangement which permits individually prescribable control of the conditions of illumination and shading.

This object is achieved by means of the transparent pane arrangement specified in claim 1.

By virtue of the fact that the transmission property of individual strips can be selectively varied, the two strip-like layers made from the material with variable transmission properties renders it possible to achieve a screening effect which ensures reflection and/or absorption of radiation which strikes the pane at a first angle of incidence, while it is immediately possible to look through the pane at a different angle, thus also directly possible for scattered light to pass through the pane arrangement. The result of this is to prevent people located in the interior from being dazzled directly by insolation, while it is possible both for daylight to fall into the interior, and for the pane arrangement to be looked through.

The pane arrangement according to the invention also permits the conditions of illumination and shading to be set individually, by virtue of the fact, for example, that only a prescribed region of the pane is provided with the strip-shaped layers made from the material with variable transmission properties, or by virtue of the fact that the strip-shaped layers are activated only in a prescribed region.

The substrate is preferably designed as a flat panel, but it can also have a shape which is spherically curved or formed with sharp edges.

Advantageous developments of the invention are specified in the subclaims, it being advantageous, in particular, when two layers are provided which are arranged on two mutually averted surfaces of the transparent substrate.

As an alternative thereto, it is, however, also possible to provide two mutually spaced transparent substrates in the case of which the layers are respectively arranged on mutually facing surfaces of the transparent substrates.

In a further alternative refinement, a plurality of transparent substrates and more than two layers are provided, the layers being arranged on mutually spaced surfaces of the transparent substrates. This embodiment permits activation of differently spaced layers to be used to undertake optimum adaptation to the angle of incidence of the radiation to be reflected.

It is advantageous, furthermore, when the strips made from the material with variable transmission properties are arranged essentially horizontally when the pane is located in its prescribed installation alignment. This horizontal arrangement of the strips is advantageous, in particular when the sun stands very high, and thus in the case of a steep angle of incidence of the rays, and also in the case of rays which are incident on the pane arrangement essentially perpendicularly or at a blunt angle (measured in the horizontal plane).

The installation alignment of the pane arrangement is preferably perpendicular.

In an alternative embodiment, which is preferably suitable for oblique windows, the prescribed installation alignment is oblique and the pane is designed for a roof window.

In a simple embodiment, the pane arrangement is constructed such that the material with variable transmission properties automatically decreases the transmission and increases the reflection in the presence of insolation. This can be achieved, for example, by phototropic layers, the layer directed toward the outside either being invariable, with the result that the strips are, for example, printed onto the substrate by means of screen printing, and the strips of the layers situated further inward being activated automatically by the residual insolation.

However, it is particularly preferred when the material with variable transmission properties is an electrochromic material, which decreases the transmission and increases the reflection when an electric voltage is applied. This embodiment permits individual adaptation of the reflection and transmission properties to the respective application.

It is advantageous, in addition, to provide a control device having a radiation sensor for the electrochromic material, the transmission properties then being controlled as a function of the radiation intensity received by the radiation sensor.

It is, moreover, advantageous when the width of the individual strips is variable by virtue of the fact that a plurality of juxtaposed strips are combined to form a multiple strip. It is thereby possible to undertake adaptation to the angle of incidence of the direct insolation.

The layer made from electrochromic material preferably comprises a multiplicity of strips or multiple strips arranged juxtaposed in parallel in pairs, it being possible for each strip or each multiple strip of a pair to be driven individually in order to vary its transmission properties.

It is preferred in this case that in each case first strips or multiple strips and in each case second strips or multiple strips of the individual pairs of the strips or multiple strips made from electrochromic material are arranged juxtaposed alternately, and the first strips or multiple strips and the second strips or multiple strips can respectively be driven in common in order to vary the respective transmission properties. In this way, the type of double louver having alternatingly reflecting and transmitting strips is created.

If the strip-shaped layers made from electrochromic material are arranged in groups which can respectively be driven individually, and can thereby have their transmission properties varied, the strip-shaped layers of the pane arrangement can also be activated only partially as required.

In a simplified embodiment, the layers made from the material with variable transmission properties can also be provided only in a subregion of the pane arrangement.

In order to protect the layer made from the material with variable transmission properties against external mechanical effects, for example owing to rain or hail or other mechanical influences, a protective layer made from a transparent material can be applied to each of the layers provided outside on the transparent substrate.

The invention is explained in more detail below with the aid of an example and with reference to the drawing, in which:

FIG. 1 shows a pane according to the invention for vertical installation

Figure 2:
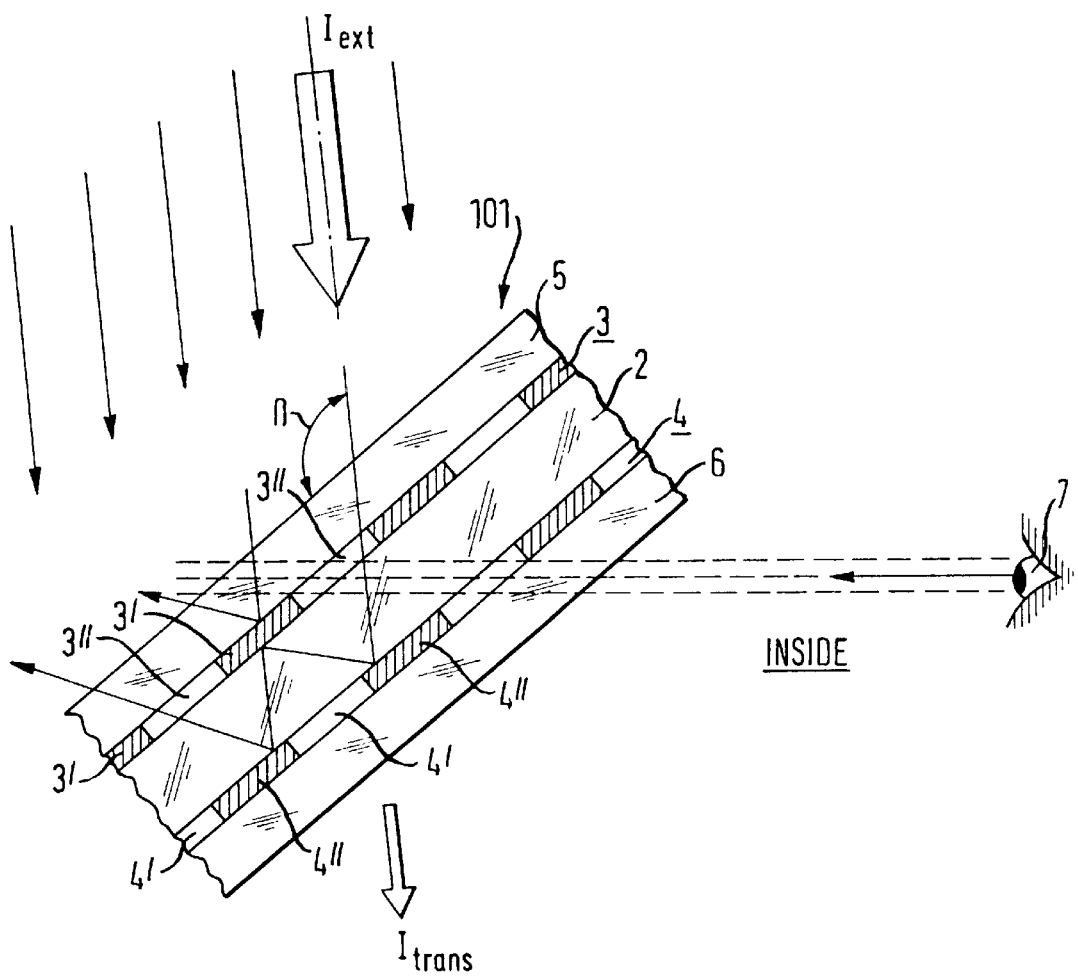
Figure 3:
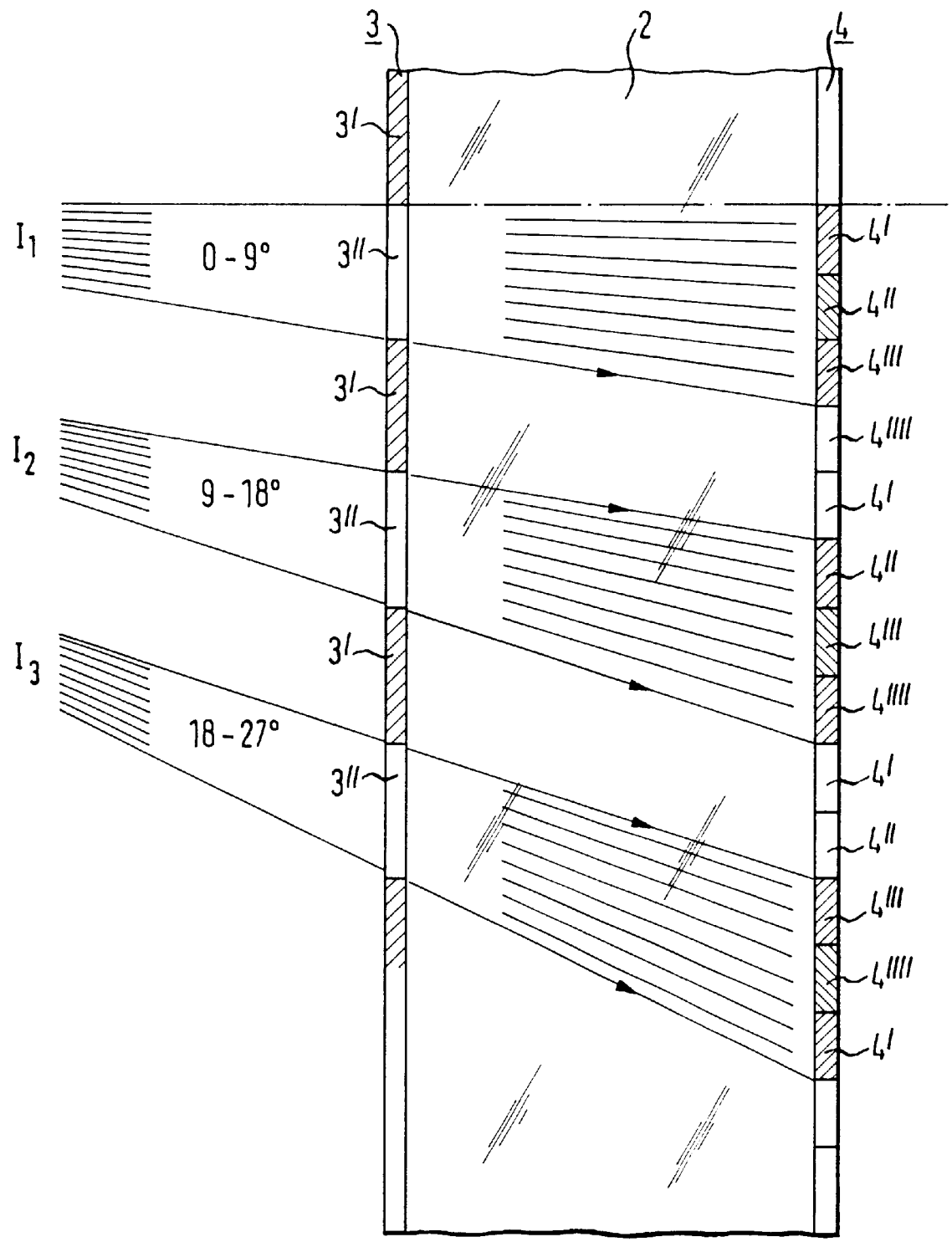

FIG. 2 shows a pane according to the invention for oblique window installation, for example in a roof window, FIG. 3 shows a pane arrangement according to the invention, which is exposed to direct irradiation by beams of different angles of incidence, and FIGS. 4a and b show a pane arrangement according to the invention and having three layers subject to different angles of incidence of the direct radiation.

FIG. 1 illustrates a transparent pane arrangement according to the invention. This pane arrangement 1 comprises a middle transparent substrate 2, for example a glass slab. Applied in each case to the two surfaces 20, 22 of the transparent substrate 2 is a layer 3, 4 made from a material with variable transmission properties for visible light and/or for thermal radiation.

The layers 3, 4 consist in the present example of an electrochromic material which varies its transmission properties for light and/or thermal radiation upon the application of an electric voltage to the layer 3, 4. In order to protect the layers 3, 4 made from electrochromic material, an outer transparent substrate 5 is mounted on the outer layer 3, and an inner transparent substrate 6 is mounted on the inner layer 4, with the result that the outer layer 3 made from electrochromic material is enclosed between the middle transparent substrate 2 and the outer transparent substrate 5, and the inner layer 4 made from electrochromic material is enclosed between the middle transparent substrate 2 and the inner transparent substrate 6.

Each of the two electrochromic layers 3, 4 is constructed like a grid having strips 3', 3", made from electrochromic material, which are arranged essentially horizontally, placed one above another and in a mutually alternating fashion, the strips 3', 3" being mutually insulated and individually drivable. It is possible in this way to influence the transmission behavior of each strip 3', 3" individually by applying an electric voltage. Each strip 3', 3" can also be constructed as a multiple strip which respectively comprises a plurality of juxtaposed strips 3' or 3".

In the present example, the strips 3', 3" are respectively combined in groups of mutually alternating strips, with the result that a first group of strips 3' and a second group of strips 3" can respectively be driven in common.

The inner electrochromic layer 4 is constructed in the same way as the outer electrochromic layer 3, and likewise has a first group of strips 4' and a second group of strips 4", which can likewise also respectively be constructed as multiple strips, it being possible for the width of the multiple strips to differ in the layers 3, 4.

In a departure from this example, arbitrary numbers of juxtaposed strips or multiple strips can be combined to form groups. Thus, for example, it is possible to determine first, second, third and fourth strips which are combined in each case with adjoining first, second, third and fourth strips to form groups of first, second, third and fourth strips.

It is also conceivable to form in the outer layer 3 a different number of groups than in the inner layer 4, with the result that, for example, groups of first, second, third and fourth strips are formed in the outer layer, while groups of first, second and third strips are formed in the inner layer. Just like the width of the individual strips or multiple strips, the selection of the number of different groups in respective layers is a decision for the person skilled in the art when designing the pane arrangement according to the invention.

In the example of FIG. 1, the first strips 3' of the outer electrochromic layer 3 are of the same width as the second strips 3" of the outer electrochromic layer. However, it is also possible to fix the width of the individual strips 3' and 3" differently. The arrangement of the strips 4' and 4" of the inner electrochromic layer 4, and the width of the individual strips 4', 4" corresponds in the example to that of the outer electrochromic layer 3, although, as already stated, it is also possible to provide different dimensionings between the inner electrochromic layer 4 and the outer electrochromic layer 3. The width of the strips 4' or 4" can also differ within the inner layer 4.

The transparent pane arrangement 1 illustrated in FIG. 1 is provided for use in a window extending perpendicularly. For this purpose, the first strips 3' of the outer electrochromic layer 3, seen in the horizontal direction, are in each case opposite the respective first strips 4' of the inner electrochromic layer 4 such that the individual strips 3', 4' are mutually aligned. Consequently, the second strips 3" of the outer electrochromic layer 3, and the second strips 4" of the inner electrochromic layer 4 are also mutually aligned in the horizontal direction. In the example shown in FIG. 1, the first group of strips 3' of the outer electrochromic layer 3, and the first group of strips 4' of the inner electrochromic layer 4 are respectively driven in such a way that the transmission behavior of the respective strips 3', 4' is strongly decreased and, consequently, their reflection behavior has been strongly increased.

Insolation $I_{ext}$ arriving at the transparent pane arrangement 1 under an angle $\alpha$ is initially partially reflected by the strips 3' of the outer electrochromic layer 3 with high reflective properties (arrow $R_1$). The fraction of the radiation $I_{ext}$ passing through the strips 3" of the outer electrochromic layer 3 with low reflective and high transmission properties is reflected considerably at the strips 4" with high reflective properties of the inner electrochromic layer 4 and passes to the outside again through a strip 3" with high transmission properties of the outer electrochromic layer 3. This process is illustrated by the arrow $R_2$.

In this way, only a fraction of the insolation $I_{ext}$ incident on the transparent pane arrangement 1 passes through the pane arrangement. This portion passing through is denoted in FIG. 1 by $I_{trans}$.

Although the directly incident insolation is reflected to the outside again by the previously outlined design of the transparent pane arrangement 1 according to the invention, the pane arrangement 1 is not completely darkened, since sufficient light, for example scattered light, can pass through the strips 3", 4", mutually aligned horizontally, with high transmission of the outer electrochromic layer 3 and the inner electrochromic layer 4 into the interior, situated to the right of the pane arrangement 1 in FIG. 1, in order to light up the interior sufficiently. Furthermore, a viewer located in the interior and illustrated symbolically in FIG. 1 by the eye 7 (and likewise a viewer standing outside) can look through the transparent pane arrangement 1 without, however, being dazzled by the insolation.

The activation of the strips 4' of the inner electrochromic layer can be controlled as a function of the angle of incidence a of the insolation, with the result that on the inner electrochromic layer 4 in each case only those strips are activated on which the sunbeams passing through the outer electrochromic layer 3 are incident. In this case, the driving of the individual strips 4' and 4" of the inner electrochromic layer 4 can be undertaken by sensors (not shown) assigned to the respective strips, via an electronic control system. In the same way, it is also possible for the strips of the outer electrochromic layer 3 to be driven via corresponding sensors. However, in a simpler embodiment the strips of the outer layer can also be invariable and be applied to the substrate 2 by means of screen printing, for example.

FIG. 2 shows an alternative embodiment in the case of which the transparent pane arrangement 101 is obliquely positioned, as is the case in a roof window, for example. FIG. 2 shows a situation in which the angle of incidence β of the insolation is steeper than in FIG. 1. In this example, as well, the pane arrangement is designed, as in the example of FIG. 1, in the same way from three transparent substrates 2, 5, 6 and two electrochromic layers 3, 4. Because of the oblique position of the pane arrangement 101, in this example the strips 3' of the outer electrochromic layer and the layers 4", spaced apart therefrom, of the inner electrochromic layer 4 are, however, driven such that a horizontal view is possible through this obliquely positioned pane arrangement 101, while the incidence of the direct insolation $I_{ext}$ is for the most part prevented, as in the example of FIG. 1.

FIG. 3 shows a pane arrangement according to the invention, having a transparent substrate 2, an outer layer 3 and an inner layer 4, in each case made from a material with variable transmission properties.

The individual strips 3', 3" of the outer layer 3 are wider than the respective strips 4', 4", 4'", 4"" of the inner layer 4. The strips of the inner layer 4 can be activated such that a plurality of juxtaposed strips can be combined to form an activated group of strips. The activated strips are illustrated in each case in FIG. 3 by dark hatching.

The upper beam $I_1$ of FIG. 3 blocks out direct insolation at angles of incidence of 0° to 9°. In the case of this beam incidence, it is the inner strips 4' and 4", situated flush immediately opposite the non-activated outer strip 3", and the inner strip 4'" arranged below them which are activated, with the result that the penetration of direct radiation into the interior situated on the right-hand side of FIG. 3 is prevented.

The middle beam $I_2$ illustrated in FIG. 3 blocks out a range of angle of incidence from 9° to 18°. In this case, it is the strip 4", situated flush opposite the lower half of the non-activated outer strip 3", of the inner layer 4, and the two strips 4'" and 4"" situated below it which are activated in order to prevent incidence of direct radiation in the interior.

The lower beam in FIG. 3 is incident on the pane arrangement at angles of incidence of between 18° and 27°. In this case, it is not the two inner strips 4' and 4" situated flush opposite the non-activated outer strip 3" which are activated, but the following strips 4'", 4"" and 4' situated therebelow.

FIG. 3 therefore shows how it is possible to adapt the shading to the angle of incidence of the direct radiation by combining different juxtaposed strips of the inner layer.

In the embodiment of FIG. 3, the width of a strip 4', 4", 4'", 4"" of the inner layer 4 is half as large as the width of a strip 3', 3" of the outer layer 3. A horizontal view through of at most 25 percent is possible due to the type of activation of the inner and outer strips in FIG. 3. In order to maximize the horizontal view through in simultaneous conjunction with optimization of the glare protection, the target is to subdivide the inner layer, which is on the room side, as far as possible, that is say, therefore, to make the width of strips as small as possible.

Figure 4:
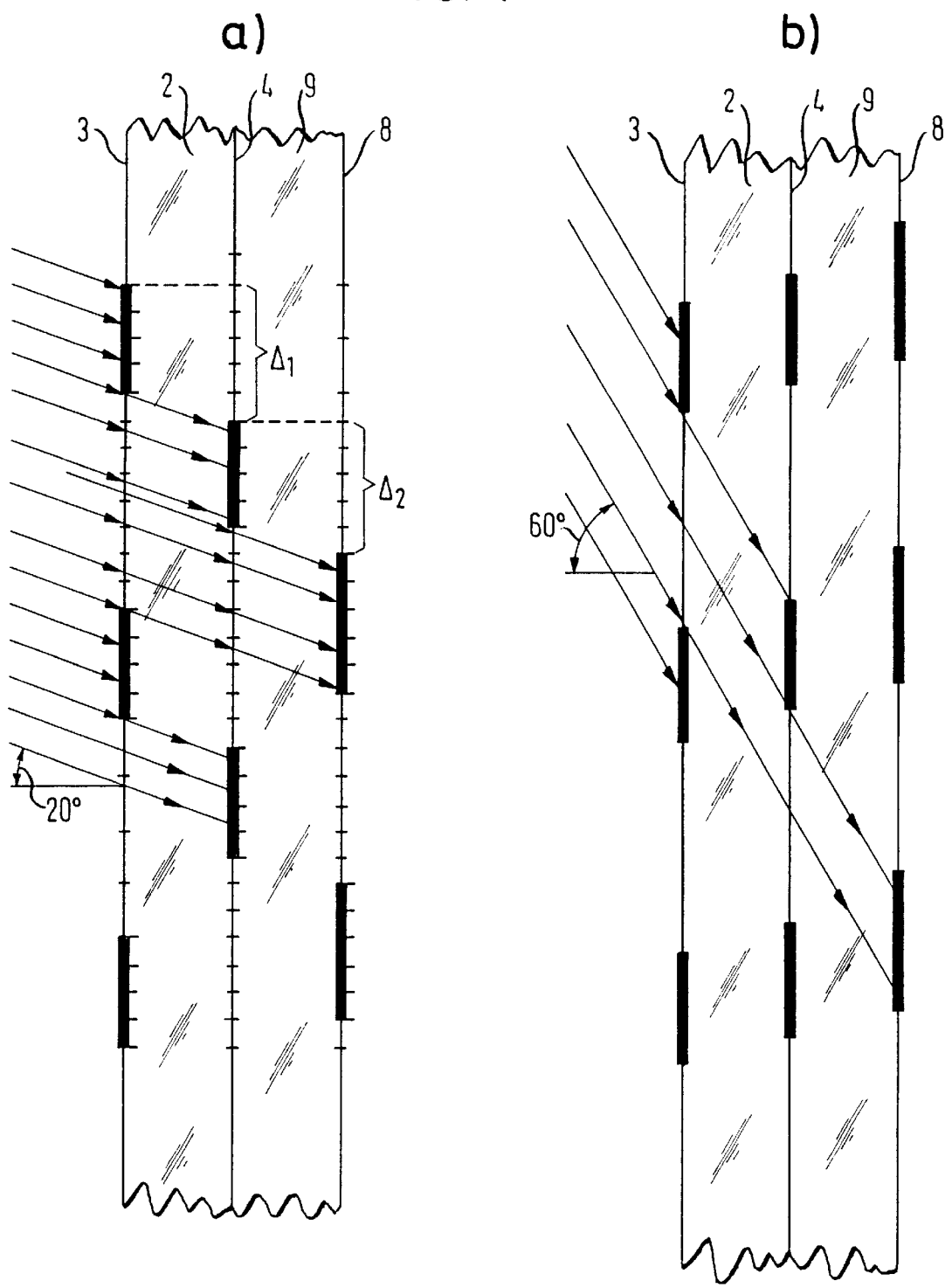

FIGS. 4a and 4b likewise show the shading for different angle of incidence of 20° (FIG. 4a) and 60° (FIG. 4b). However, in the case of the embodiment according to FIG. 4, three layers 3, 4 and 8 are provided which are respectively separated from one another by substrates 2, 9 made from transparent material. In the case of this embodiment as well, the strips of the individual layers 3, 4, 8 are combined to form groups of strips, the strips being activated in conjunction with adaptation to the angle of incidence of the direct radiation, depending on the angle of incidence, in a way similar to that described with reference to FIG. 3. With this embodiment, in the case of the angle of incidence of radiation of 20° (FIG. 4a), which corresponds to a solar altitude angle typical of wintertime, only every third group of strips, which respectively comprises four juxtaposed strips, is activated in the outer layer 3. In the middle layer 4, it is likewise only every third group of strips, likewise comprising four strips in each case, which is activated, a vertical displacement $\Delta_1$ of five strips being provided between the outer layer 3 and the middle layer 4.

In the inner layer 8 an activated group of strips for blocking out grazing light comprises five strips, the vertical displacement between the top edge of an activated strip on the middle layer 4 and the inner layer 8 being $\Delta_2=5$ strips. In order to block out grazing light, the group comprising five strips can also be located on each of the two other layers. Since each group of strips of the inner layer 8 comprises five activated strips, the subsequently following interspace made from non-activated strips is one strip smaller than in the middle layer 4 and in the outer layer 3. This additional activation of a further strip in the inner layer 8 produces a maximum view through from the inside to the outside of up to 7/12, depending on the solar altitude angle and the strip activation optimum therefor.

In order to block out scattered light, in a case of n strips on one of at least two strips n+1 strips are to be activated.

FIG. 4b shows the same design as in FIG. 4a, the angle of incidence of radiation being 60°, which is typical for the solar altitude angle at the latitude of 50° in summertime. In the case of this embodiment, as well, a strip is activated more strongly in the inner layer 8 than in the outer layer 3 and the middle layer 4; only the position of the activated layers is changed by comparison with FIG. 4a, and adapted to the steeper angle of incidence of radiation.

The width of the individual strips can be smaller than the thickness of the respective neighboring substrate.

The thickness of the substrate can be in the region of 1 mm to 10 mm, as is customary, for example, in the case of conventional glazing in the building sector. Also possible, however, are microstructures in which the thickness of the substrate is less than 1 mm, and in the case of which the strips are to be applied in a fashion which is appropriately small and fine. However, it is also possible to create macrostructures in which the substrate is greater than 10 mm. It would thereby be possible to produce space grids which, starting from a specific thickness, have a combination of substrate and a layer of air or a different substance or medium instead of the slab-like substrate. The interspace between neighboring substrates or between substrate and neighboring layer made from the material with variable transmission properties can, for example, be filled with gas, fluid or a solid. Gas- or fluid-filled interspaces can, moreover, also be flowed through.

In order to implement the present invention for the purpose of shading or reducing glare, it is, furthermore, advantageous to select the dimensioning of the individual strips such that diffraction phenomena are prevented at the strips.

However, for the purpose of achieving special optical effects, the present invention can basically also be configured in such a way as to specifically produce diffraction or refraction phenomena of the light incident on the pane arrangement or passing through it, so as to achieve aesthetic effects thereby.

Thus, in order to produce special aesthetic effects, the arrangement of neighboring strips can, for example, be selected such that the strips are arranged not to be parallel and/or equidistant, in order either to create a homogeneous, uniform of an inhomogeneous, nonuniform light-shade pattern on the side of the pane arrangement averted from the illumination side. Of course, it is likewise possible to achieve aesthetic effects by targeted activation of the strips by deliberately produced reflective phenomena with superimposed diffraction and/or refraction effects even on the illumination side of the pane arrangement. The strips can either have a constant thickness or width, but also a thickness or width which changes as desired, there being no need for strips which are one behind another or neighboring one another respectively to have the same variation in thickness or width.

In addition to linearly arranged strips, it is also possible to implement strip patterns which are of any desired curvilinear shape, resemble fans or are concentric, there being no need for the strips of two strip arrangements arranged one behind another, that is to say the strips in two neighboring layers, to have the same basic geometries in each case. Thus, for example, the design can comprise an external linear strip pattern facing the irradiation side, and a concentric strip design located thereafter seen in the direction of radiation.

Any desired optical impressions can be produced by selecting the strip geometry and the strip material, that is to say the material of the substrates. Thus, optical effects such as, for example, interference, refraction or diffraction of the irradiated light can be consciously produced at the strips of the different layers made from material with variable transmission properties. In this case, for example, it is also possible additionally for the light to be polarized in a plane or filtered.

In these above embodiments of the invention, it is therefore possible to achieve optical aesthetic effects, which can be prescribed in a controlled fashion, on such a pane arrangement by means of arbitrarily prescribable activation of strips or strip arrangements or of appropriate arbitrary influences exerted on the layers made from a material with variable transmission properties.

The invention is not limited to the above exemplary embodiments, which serve merely to explain the core concept of the invention in general terms. Rather, it is also possible within the framework of the scope of protection for the device also to assume embodiments other than those described above. In particular, in this case the device can have features which constitute a combination of the respective individual features of the claims.

Reference numerals in the claims, the description and the drawings merely serve the purpose of better comprehension of the invention and are not intended to limit the scope of protection.

What is claimed is:

1. A transparent pane arrangement with a prescribed installation alignment, having at least one transparent substrate and at least two layers made from a material with variable transmission properties for visible light and/or thermal radiation, both layers extending in a plane and both layers respectively comprising strips which are arranged parallel to one another and are made from the material with variable transmission properties characterized in that the layers are mutually spaced in the direction of the surface normal.

2. The transparent pane arrangement as claimed in claim 1, wherein two layers are provided which are arranged on two mutually averted surfaces of the transparent substrate.

3. The transparent pane arrangement as claimed in claim 1, wherein two mutually spaced transparent substrates are provided, and wherein the layers are respectively arranged on mutually facing surfaces of the transparent substrates.

4. The transparent pane arrangement as claimed in claim 1, wherein a plurality of transparent substrates and more than two layers are provided, and wherein the layers are arranged on mutually spaced surfaces of the transparent substrates.

5. The transparent pane arrangement as claimed in claim 1, wherein the strips made from the material with variable transmission properties are arranged essentially horizontally when the pane is located in its prescribed installation alignment.

6. The transparent pane arrangement as claimed in claim 1, wherein the prescribed installation alignment is vertical.

7. The transparent pane arrangement as claimed in claim 1, wherein the prescribed installation alignment is oblique, and wherein the pane is designed for a roof window.

8. The transparent pane arrangement as claimed in claim 1, wherein the material with variable transmission properties automatically decreases the transmission and increases the reflection in the presence of insolation.

9. The transparent pane arrangement as claimed in claim 1, wherein the material with variable transmission properties is a material with a controllable light transmission, in particular an electrochromic material, which decreases the transmission and increases the reflection when an electric voltage is applied.

10. The transparent pane arrangement as claimed in claim 9, wherein a control device having a radiation sensor is provided for the material with a controllable light transmission, and wherein the transmission properties are controllable as a function of the radiation intensity received by the radiation sensor.

11. The transparent pane arrangement as claimed in claim 9, wherein the width of the individual strips is variable by virtue of the fact that a plurality of juxtaposed strips may be combined to form a multiple strip.

12. The transparent pane arrangement as claimed in claim 9, wherein the layer made from material with a controllable light transmission comprises a multiplicity of strips or multiple strips arranged juxtaposed in parallel in pairs, it being possible for each strip or each multiple strip of a pair to be driven individually in order to vary its transmission properties.

13. The transparent pane arrangement as claimed in claim 12, wherein in each case first strips or multiple strips and in each case second strips or multiple strips of the individual pairs of the strips or multiple strips made from material with a controllable light transmission are arranged juxtaposed alternately, and wherein the first strips or multiple strips and the second strips or multiple strips can respectively be driven in common in order to vary the respective transmission properties.

14. The transparent pane arrangement as claimed in claim 10, wherein the strip-shaped layers made from material with a controllable light transmission are arrangement in groups which can respectively be driven individually and can thereby have their transmission properties varied.

15. The transparent pane arrangement as claimed in claim 1, wherein the layers made from the material with variable transmission properties are provided only in a subregion of the pane arrangement.

16. The transparent pane arrangement as claimed in claim 3, wherein a protective layer made from a transparent material is applied to each of the layers provided outside on the transparent substrate.

17. The transparent pane arrangement as claimed in claim 1, wherein the rearside, facing the interior, or at least one of the layers made from the material with variable transmission properties is of reflective design.

18. The transparent pane arrangement as claimed in claim 1, wherein the rearside, facing the interior, of at least one of the layers made from the material with variable transmission properties is of non-reflective design.

19. The transparent pane arrangement as claimed in claim 1, wherein the layers made from the material with variable transmission properties start at respectively the same height level.

20. The transparent pane arrangement as claimed in claim 1, wherein the layers made from the material with variable transmission properties are constructed in a prefabricated fashion on a film carrier.

21. The transparent pane arrangement as claimed in claim 1, wherein the first, outer layer made from the material with variable transmission properties has a material with a controllable light transmission, in particular an electrochromic material, and wherein the inner layer(s) made from the material with variable transmission properties has/have a material with passive adaptation of a light transmission, in particular a phototropic or photochromic material.

22. The transparent pane arrangement as claimed in claim 1, wherein the layers, constructed as electrochromic layers, made from the material with variable transmission properties can be activated by photovoltaic elements.

23. The transparent pane arrangement as claimed in claim 1, wherein a sensor-controlled control device is provided by means of which in each case the strips, required for the purpose of completely masking out direct radiation, of the individual layers can be individually driven automatically.

24. The transparent pane arrangement as claimed in claim 1, wherein a multiplicity of layers which are slightly mutually spaced and subdivided in the form of strips and are made from the material with variable transmission properties are provided in the pane arrangement.

25. The transparent pane arrangement as claimed in claim 1, wherein the width of the individual strips is smaller than the thickness of the respective neighboring substrates.

26. The transparent pane arrangement as claimed in claim 1, wherein in the case of n strips on one of the at least two strips, n+1 strips are activated.

* * * * *